United States Patent
Ue

(10) Patent No.: US 7,786,651 B2
(45) Date of Patent: Aug. 31, 2010

(54) MICROMOTION MECHANISM HAVING ULTRASONIC MOTOR AND OSCILLATION ELEMENT HOLDING MECHANISM

(75) Inventor: Yoshihiro Ue, Hidaka (JP)

(73) Assignee: Olympus Corporation, Tokyo (JP)

( * ) Notice: Subject to any disclaimer, the term of this patent is extended or adjusted under 35 U.S.C. 154(b) by 244 days.

(21) Appl. No.: 12/009,390

(22) Filed: Jan. 18, 2008

(65) Prior Publication Data
US 2008/0211351 A1 Sep. 4, 2008

(30) Foreign Application Priority Data
Jan. 26, 2007 (JP) ............................. 2007-016972

(51) Int. Cl.
*H02N 2/00* (2006.01)
(52) U.S. Cl. .............................. 310/323.09; 310/323.17
(58) Field of Classification Search ............ 310/323.01, 310/323.02, 323, 9, 323.12, 323.16, 323.17
See application file for complete search history.

(56) References Cited

U.S. PATENT DOCUMENTS

| | | | | |
|---|---|---|---|---|
| 5,087,851 A | * | 2/1992 | Nakazawa et al. | 310/323.16 |
| 5,191,688 A | * | 3/1993 | Takizawa et al. | 29/25.35 |
| 5,852,336 A | | 12/1998 | Takagi | 310/323.01 |
| 6,392,328 B1 | * | 5/2002 | Ashizawa | 310/323.01 |
| 7,129,620 B2 | * | 10/2006 | Sakano et al. | 310/323.09 |
| 7,129,621 B2 | * | 10/2006 | Sakano et al. | 310/323.09 |
| 2004/0056564 A1 | * | 3/2004 | Iino et al. | 310/323.02 |
| 2006/0202589 A1 | | 9/2006 | Kasai et al. | |

FOREIGN PATENT DOCUMENTS

| | | | | |
|---|---|---|---|---|
| JP | 1-264582 A | * | 10/1989 | ................ 310/345 |
| JP | 07-264880 A | | 10/1995 | |
| JP | 9-121574 A | | 5/1997 | |
| JP | 10-327589 A | | 12/1998 | |
| JP | 3184117 B2 | | 4/2001 | |
| JP | 2005-265996 A | | 9/2005 | |
| JP | 2006-254627 A | | 9/2006 | |

OTHER PUBLICATIONS

Japanese Office Action dated May 19, 2009 (4 pages), and English translation thereof (3 pages), issued in counterpart Japanese Application Serial No. 2007-016972.

* cited by examiner

*Primary Examiner*—Thomas M Dougherty
(74) *Attorney, Agent, or Firm*—Frishauf, Holtz, Goodman & Chick, P.C.

(57) ABSTRACT

A micromotion mechanism having an ultrasonic motor includes: a fixing base; a moving element supported to be movable in the moving axis direction with respect to the fixing base; an oscillation element having a rectangular geometry including a first plane parallel to the moving axis direction and provided with a plurality of projections and a second plane parallel to the first plane for exciting a plurality of oscillation modes by applying a high frequency voltage signal, and a holding mechanism for holding the oscillation element with respect to the fixing base. The holding mechanism is fixed to a part of the second plane of the oscillation element, and is incorporated with a high rigidity material not including high nonlinearity elements including at least one of a friction sliding unit and a rubber member.

3 Claims, 10 Drawing Sheets

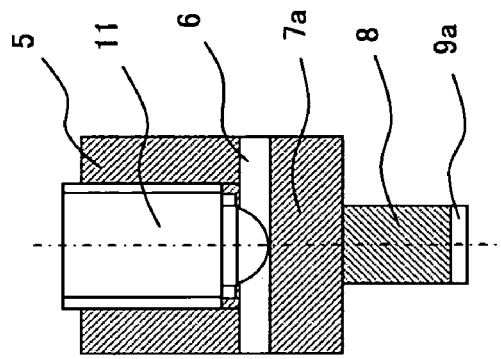
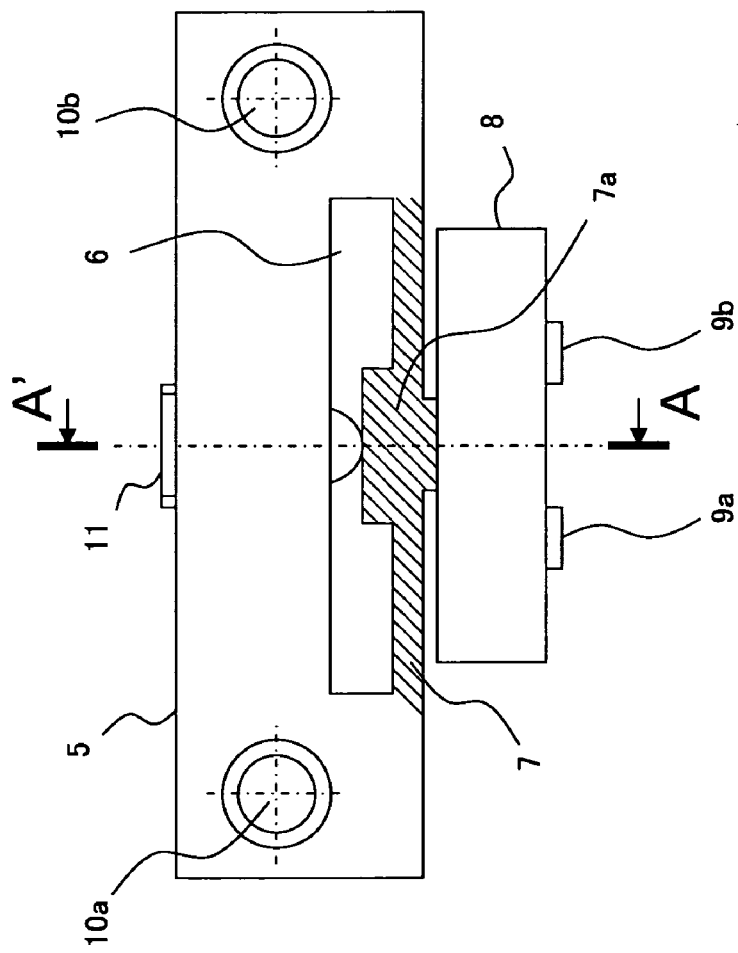
FIG. 4B
FIG. 4A

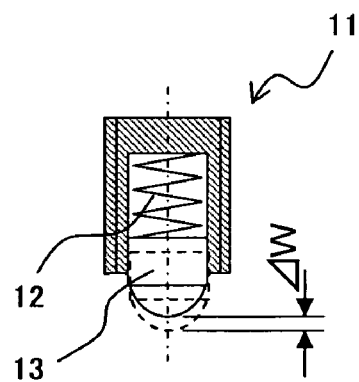
F I G. 5

MICROMOTION MECHANISM HAVING ULTRASONIC MOTOR AND OSCILLATION ELEMENT HOLDING MECHANISM

CROSS REFERENCE TO RELATED APPLICATIONS

This application is based upon and claims the benefit of priority from the prior Japanese Patent Application No. 2007-016972, filed Jan. 26, 2007, the entire contents of which are incorporated herein by reference.

BACKGROUND OF THE INVENTION

1. Field of the Invention

The present invention relates to a micromotion mechanism having an ultrasonic motor, and more specifically to a micromotion mechanism for positioning a moving element supported such that the element can be moved with respect to a fixing base.

2. Description of the Related Art

A microscope is widely used in observing the microstructure of a semiconductor, a living body sample, etc. An XY stage is used in setting an optional position of an observation target for a microscopic observation. In this case, a feed resolution and the stability in a static position demanded for a microstructure to be observed are required. In addition, it is often necessary to observe plural positions of an observation object with high throughput, thus high-speed operation is also required.

One of the actuators corresponding to the above-mentioned requests is an ultrasonic motor. For example, as described in the patent document 1 (Japanese Published Patent Application No. 2005-265996), there is an apparatus proposed using an ultrasonic motor as an actuator of the XY stage for a microscope. There is also the configurations described in the patent document 2 (Japanese Published Patent Application No. H7-264880) and the patent document 3 (Japanese Patent Publication No. 3184117) as an ultrasonic motor and its holding method.

Recently, with more miniaturization of observing submicroscopic objects such as observing a stroke width of a semiconductor, observing a molecule of a living body, etc., the magnifying power of a microscope is also getting higher. Thus, high drive resolution of an ultrasonic motor for the microscope in a submicron order has been required. Furthermore, for example, an apparatus such as an incubator for living body sample can be mounted on a stage of a microscope. In this case, a bending resistance such as a carrying load, wiring, etc., and external force such as a touch of a hand etc. require large static holding and drive force of an ultrasonic motor.

On the other hand, the ultrasonic motor moves a moving element by the friction when it presses the oscillator onto a moving element. In the case of microscopic drive in a submicron order, the pressing force on the oscillator onto the moving element changes the amount of movement of the moving element. For example, microscopic drive is made on a certain drive condition in a drive mechanism having the configuration as shown in the schematic chart of FIG. 1, there is the relationship shown in FIG. 2 between the pressing force and the amount of movement.

The drive mechanism shown in FIG. 1 includes a fixing base 31, a moving element 33 supported by a guide 32 such as a linear ball guide etc., which is movable with respect to the fixing base 31, an oscillation element 35 provided with a projection unit 34 (34a and 34b) contacting the moving element 33, a holding member 36 for holding the oscillation element 35 with respect to the fixing base 31. In this case, for example, if the oscillation element 35 is microscopically driven by the application of a drive signal with the oscillation element 35 pressed against the moving element 33 through the projection unit 34 with the pressing force F, then the moving element 33 is moved along the guide 32 by the amount of movement S. In FIG. 2, the vertical axis indicates the amount of movement S and the horizontal axis indicates the pressing force F.

As shown in FIG. 2, the amount of movement S increases with the increase of the pressing force F, and the amount of movement S is the maximum with the pressing force $F_{OP}$. Afterwards, the amount of movement S decreases, and the moving element 33 does not move any more or moves backwards after the pressing force $F_{max}$ is exceeded. Thus, it is necessary to load the optimum pressing force $F_{OP}$ to correctly and efficiently obtain the microscopic drive.

SUMMARY OF THE INVENTION

The apparatus according to an aspect of the present invention is a micromotion mechanism having an ultrasonic motor, and including: a fixing base, a moving element supported to be movable in the moving axis direction with respect to the fixing base, an oscillation element having a rectangular geometry including a first plane parallel to the moving axis direction and provided with a plurality of projections and a second plane parallel to the first plane for exciting a plurality of oscillation modes by applying a high frequency voltage signal, and a holding mechanism for holding the oscillation element with respect to the fixing base. The holding mechanism is fixed to a part of the second plane of the oscillation element, and is incorporated with a high rigidity material not including high nonlinearity elements including at least one of a friction sliding unit and a rubber member.

The apparatus according to another aspect of the present invention is an oscillation element holding mechanism in a micromotion mechanism including: a fixing base, a moving element supported to be movable in the moving axis direction with respect of the fixing base, and an ultrasonic motor. The oscillation element included in the ultrasonic motor has a rectangular geometry including a first plane parallel to the moving axis direction and provided with a plurality of projections and a second plane parallel to the first plane for exciting a plurality of oscillation modes by applying a high frequency voltage signal. The oscillation element holding mechanism is fixed to a part of the second plane of the oscillation element and incorporated with a high rigidity material not including high nonlinearity elements including at least one of a friction sliding unit and a rubber member, and holds the oscillation element with respect to the fixing base.

BRIEF DESCRIPTION OF THE DRAWINGS

FIG. 4A is a partial top view of the micromotion mechanism according to the first mode for embodying the present invention;

FIG. 4B is a sectional view along the line A to A' shown in FIG. 4A;

FIG. 5 is a sectional view of a plunger;

DESCRIPTION OF THE PREFERRED EMBODIMENT

The mode for embodying the present invention is described below with reference to the attached drawings.

First Mode for Embodying the Present Invention

Figure 1:
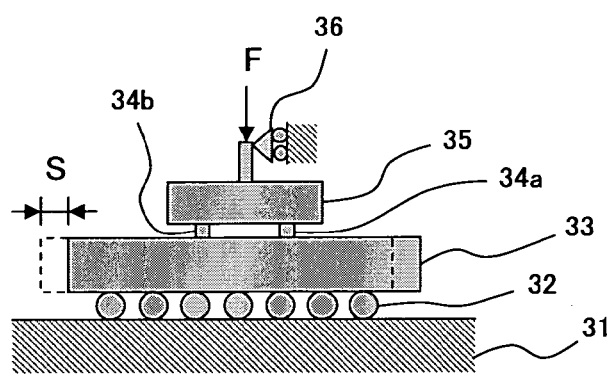
FIG. 1 is a schematic chart of the drive mechanism for moving an moving element.
Figure 2:
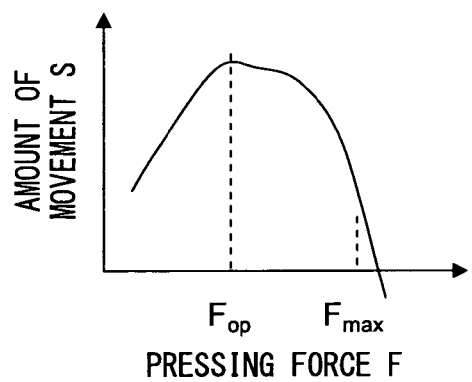
FIG. 2 shows the relationship between the pressing force and the amount of movement.
Figure 3:
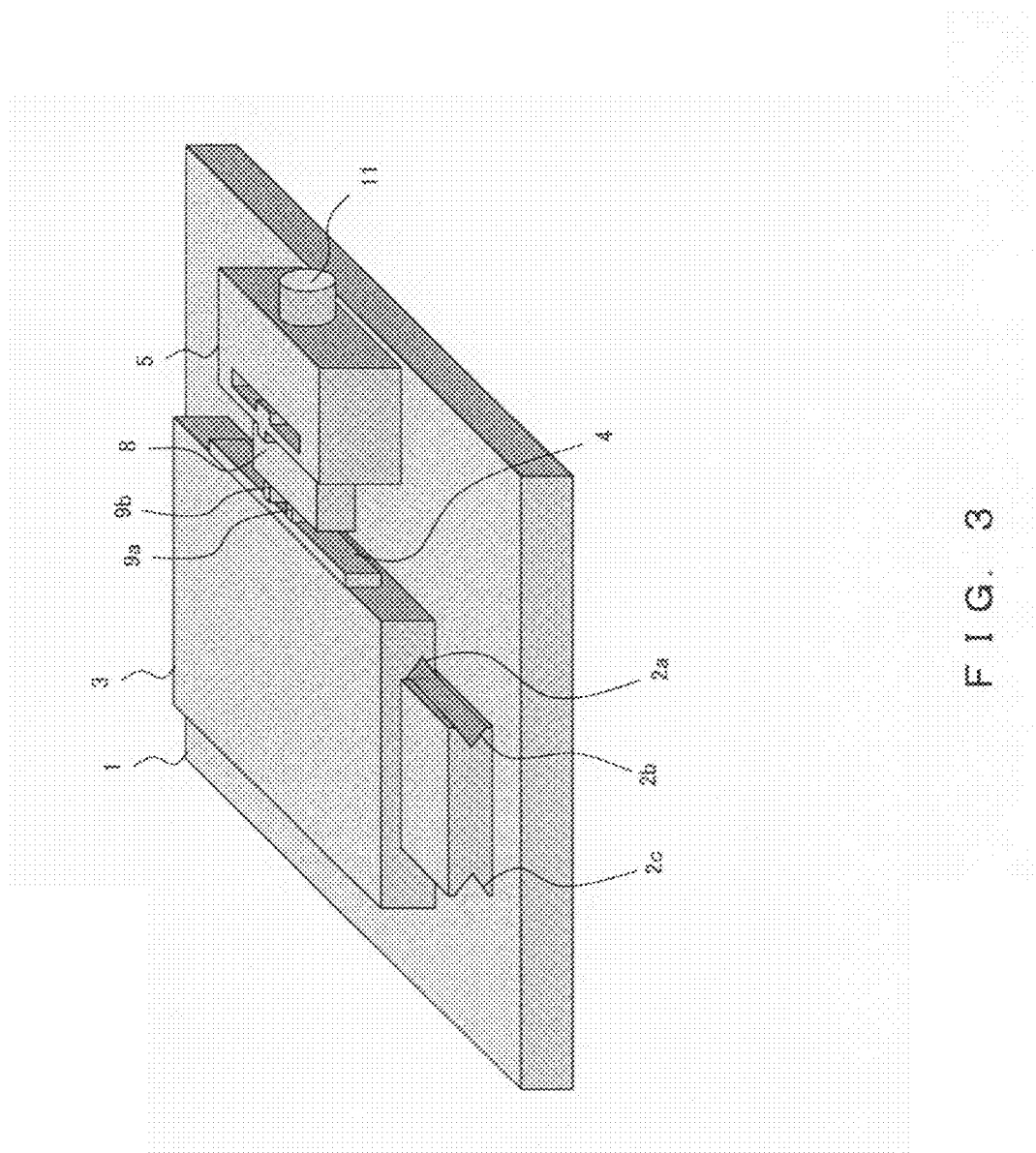
FIG. 3 is a perspective view of the micromotion mechanism provided with an ultrasonic motor according to the first mode for embodying the present invention.

FIG. 3 is a perspective view of the micromotion mechanism provided with an ultrasonic motor according to the first mode for embodying the present invention. FIG. 4A is a partial top view of the micromotion mechanism according to the present mode, and FIG. 4B is a sectional view along A-A' shown in FIG. 4A. FIG. 5 is a sectional view of a plunger.

The micromotion mechanism according to the present mode is an apparatus capable of performing positioning in a submicron order, and an apparatus applicable to a microscope system, electronic equipment, etc. for which a correct microscopic movement of a moving target is requested.

As shown in FIG. 3, a moving element 3 supported such that it can be moved in one axis direction as a moving axis direction using guides 2 (2a, 2b, and 2c in FIG. 3) with respect to the fixing base 1 is held on the fixing base 1. The guides 2 are, for example, linear ball guides etc. On the side of the moving element 3, for example, a sliding member 4 made of a hard material such as ceramic etc. is mounted.

A holding member 5 is a holding mechanism for holding an oscillation element 8 with respect to the fixing base 1, and is formed by a metal material such as aluminum. The holding member 5 is provided with a thin leaf spring 7 (portion indicated by the diagonal lines in FIG. 4A) formed by providing a notch portion 6 by wire discharging process etc. as shown in detail in FIG. 4A. At the center of the thin leaf spring 7, a thick portion 7a not functioning as a spring is formed, and the thick portion 7a and the oscillation element 8 are adhered with a hard adhesive such as a ceramic adhesive, etc. At this time, the thin leaf spring 7 and the oscillation element 8 are mounted such that they can be parallel to each other. The thick portion 7a is adhered around the center of the face of the oscillation element 8 on which the thick portion 7a is attached.

Thus, according to the present mode, adhering the oscillation element 8 to the thick portion 7a not functioning as a spring prevents the adhesion from being stripped off from the oscillation element 8 when the thin leaf spring 7 bends. In addition, by mounting the thin leaf spring 7 and the oscillation element 8 such that they can be close to each other, the rigidity of the thin leaf spring 7 in the tensile pressure direction can be enhanced. The geometry of the thick portion 7a formed at the center of the thin leaf spring 7 is not limited to the geometry shown in FIG. 4A, but can be any other geometries so far as the adhesion to the oscillation element 8 can be thick enough to protect against strip-off, the thin leaf spring 7 and the oscillation element 8 can be mounted parallel and close to each other, and pressing means such as a plunger 11 etc. described later can appropriately provide pressing force.

In the oscillation element 8, two projections 9 (9a and 9b) are provided on the reverse side of the face on which the thick portion 7a of the holding member 5 is adhered. The projections 9 are formed by a material including resin as a base material having a relatively low friction coefficient such as polyacetal including reinforced fiber, and ceramic. The holding member 5 is fixed to the fixing base 1 through fixing screw holes 10 (10a and 10b) with the two projections 9 contacting the sliding member 4. At this time, it is desired that there is almost no bending of the thin leaf spring 7, and the pressing force to the moving element 3 is nearly zero. In FIG. 3, the fixing screw holes 10 and screws for fixing the holding member 5 to the fixing base 1 are omitted.

A female screw is formed on the holding member 5. In detail, as shown in FIG. 4B, the thick portion 7a can be pressed by screwing the plunger 11 where a male screw is formed on the perimeter into the holding member 5. The plunger 11 contains a coil spring 12 as shown in FIG. 5, and the pressing force is generated by pushing a tip member 13. Therefore, the pressing force depending on the amount of movement (ΔW shown in FIG. 5) of the tip member 13 of the plunger 11 is loaded into the thick portion 7a. At this time, the oscillation element 8 is also pushed with the projections 9 to the sliding member 4. The spring constant of the coil spring 12 of the plunger 11 is lower than the spring constant in the pressing direction of the thin leaf spring 7. Therefore, the plunger 11 can adjust the pressing force in more detail.

In the micromotion mechanism according to the present mode, the moving axis direction of the moving element 3, the plane on which the projections 9 are provided in the oscillation element 8, the plane on which the thick portion 7a is adhered in the oscillation element 8, and the tensile pressure direction of the thin leaf spring 7 are parallel to one another.

The oscillation element 8 can excite a plurality of oscillation modes by applying a predetermined high frequency voltage signal by a drive circuit not shown in the attached drawings. Then, by the oscillation element 8 exciting a plurality of oscillation modes, the moving element 3 can be moved with the sliding member 4 contacting the projections 9 provided for the oscillation element 8.

In the micromotion mechanism according to the present mode, the ultrasonic motor is configured by at least the oscillation element 8 and the projections 9.

In the micromotion mechanism having an ultrasonic motor according to the present mode with the above-mentioned configuration, the oscillation element 8 is held only by the integrally incorporated holding member 5 with respect to the fixing base 1, and the friction sliding unit and a nonlinear element (including a high nonlinear element) such as a rubber member, etc. are not included in the holding member 5. In addition, since the rigidity that supports the drive direction substantially matches the rigidity of the thin leaf spring 7 in the tensile compression direction, the rigidity is high. For example, in the case of a thin leaf spring having a general geometry of 0.5 mm in thickness t, 20 mm in length L, and 5 mm in width b, and made of aluminum, the rigidity in the tensile compression direction of the thin leaf spring is about 6900 N/mm. In this case, if the drive reaction is 1N, then the deformation in the tensile compression direction of the thin leaf spring is about 0.15 μm.

Thus, the contact between the projections 9 and the sliding member 4 is not changed by the oscillation of the oscillation element 8. There is no fear that the moving element 3 is stuck because of the microscopical displacement of the oscillation element 8 itself caused by the resistance force which is arisen when the moving element 3 moves. Thus, it is possible to move the moving element 3 by a microscopic amount.

Figure 6:
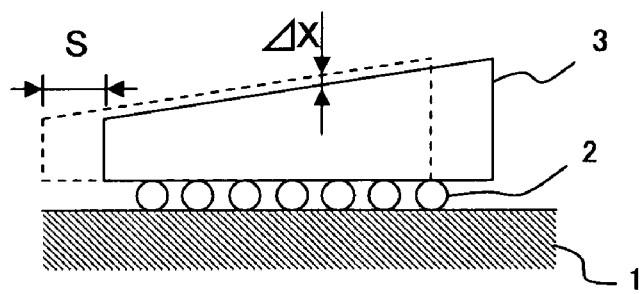
FIG. 6 is a schematic chart of the microscopic displacement in the pressing direction occurring when a moving element moves.

In the micromotion mechanism according to the present, there can be the possibility that a microscopic displacement can occur in the pressing direction by the influence of errors in processing and assembly when the moving element 3 moves. At this time, the pressing force fluctuates with the microscopic displacement, but the change of the pressing force largely depends on the rigidity that supports the oscillation element 8 in the pressing direction. If the rigidity is high, the pressing force suddenly increases, and can exceed the maximum allowance value. FIG. 6 is a schematic chart showing the microscopic displacement in the pressing direction when the moving element 3 moves. In FIG. 6, assuming that the rigidity that supports the oscillation element 8 in the pressing direction is K, the moving element 3 is moved by the amount of movement S, and the displacement of the moving element 3 in the pressing direction is $\Delta X$, the change is expressed by the pressing force $\Delta F = K \Delta X$. Thus, if the rigidity K that supports the oscillation element 8 in the pressing direction is high, then the pressing force $\Delta F$ largely changes. Therefore, there is the possibility that the pressing force can exceed $F_{max}$, and the moving element 3 is stuck.

Assume that the oscillation element 8 is pressed only by the thin leaf spring 7 formed by the holding member 5. In this example, assume that the optimum value $F_{OP}$ is 10N, and the maximum allowance value of the pressing force is 20N. In addition, assuming that the thin leaf spring 7 is simplified into a thin leaf spring on a common geometry of 0.5 mm in thickness t, 20 mm in length L, and 5 mm in width b, and the material is aluminum, the rigidity $K_P$ of the thin leaf spring in the pressing direction is about 90 N/mm. In this case, to apply the load of the optimum value $F_{OP}$, it is necessary to hold the oscillation element 8 with the thin leaf spring warped by about 0.1 mm. However, it is very difficult in the assembly process to set the pressing force with the thin leaf spring warped by 0.1 mm. For example, when the assembly error is 0.01 mm, the pressing force changes by 1N.

On the other hand, with the configuration of applying the load of the pressing force by the plunger 11 as in the micromotion mechanism according to the present mode, the pressing force can be applied without warping the thin leaf spring 7. For example, when the plunger of the size M5, which is available in the market is applied, the rigidity of the inside coil spring is about 4.5 N/mm. It is required that the plunger is screwed into the holding member by 2.2 mm to apply a load of 10N. Therefore, although an assembly error of 0.01 mm occurs, a change of the pressing force is about 0.04N.

Furthermore, although the moving element 3 is displaced toward pressing direction of the oscillation element 8 by 0.05 mm when the 3 moves, the increment of the pressing force is about 5N, and the maximum value of the pressing force is about 15N at most. Therefore, the maximum allowance value of 20N is not reached, and the microscopic drive can be performed without fail.

Furthermore, since the holding member 5 is configured by one metal part according to the micromotion mechanism according to the present mode, the number of the required parts is minimized, thereby largely reducing the production cost.

In addition, according to the present micromotion mechanism, the thick portion 7a not functioning as a spring is provided at the center of the thin leaf spring 7 of the holding member 5, and the oscillation element 8 is adhered to the thick portion 7a. Therefore, no excessive stress generated by the deformation of the spring is applied on the adhesion surface, thereby further enhancing the durability.

In the ultrasonic motor holding method as described with reference to FIG. 7 of the patent document 3 described above, the oscillation element configuring the ultrasonic motor has a notch and a portion whose geometry largely changes. Therefore, there is a higher possibility of damage by the concentration of stress. However, according to the micromotion mechanism according to the present micromotion mechanism, there is no fear of the concentration of stress on the oscillation element 8. As a result, the durability can be further enhanced.

Furthermore, since the initial warp of the thin leaf spring 7 can be substantially nullified according to the present mode, the amount of warp up to the allowed stress can be enlarged. Therefore, since the allowance range of the displacement in the pressing direction due to errors in process and assembly of the guides 2 and other parts is expanded, thereby improving the durability and reducing the production and assembly cost.

An example of using the plunger 11 as means for finely adjusting pressing force according to the present mode is described above, but other elastic means can be used if the pressing force can be finely adjusted. Furthermore, the thin leaf spring 7 and the holding member 5 can be configured as a separate configuration, or the thin leaf spring 7 can be configured by a high rigidity material other than metal.

Second Mode for Embodying the Present Invention

Figure 7:
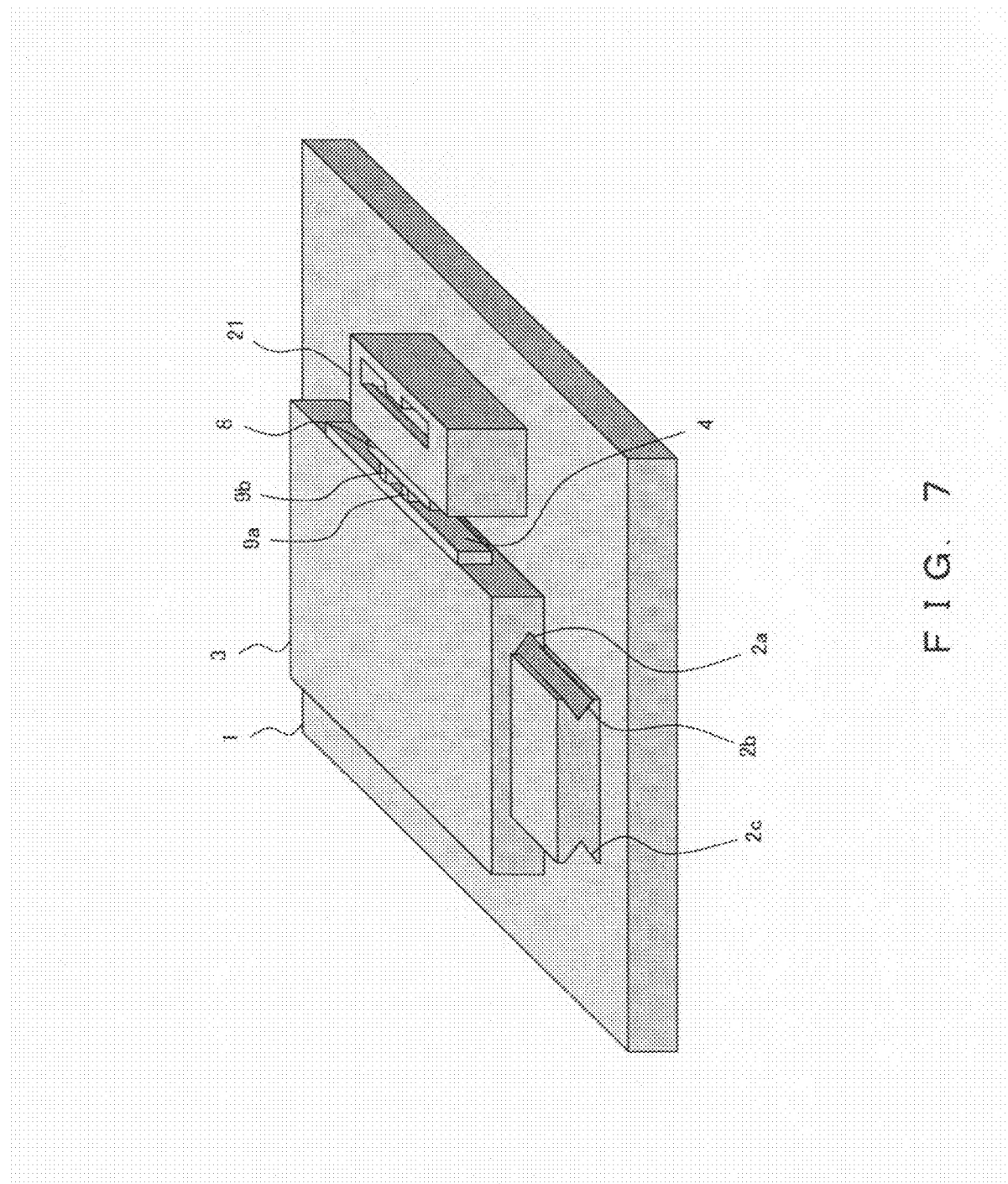
FIG. 7 is a perspective view of a micromotion mechanism provided with an ultrasonic motor according to the second mode for embodying the present invention.
Figure 8B:
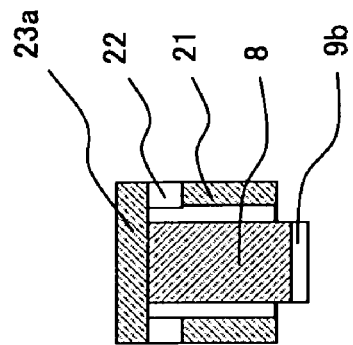
FIG. 8B is a sectional view along the line B to B' shown in FIG. 8A.
Figure 8A:
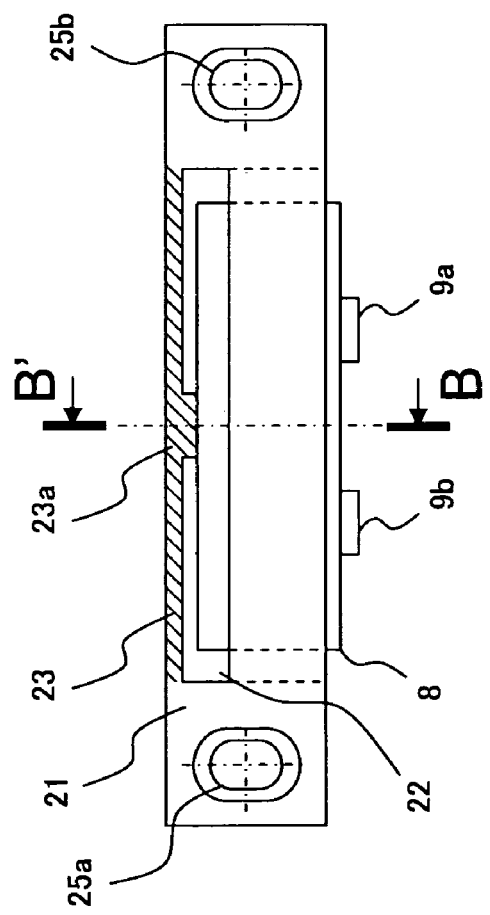
FIG. 8A is a partial top view of the micromotion mechanism according to the second mode for embodying the present invention.
Figure 9:
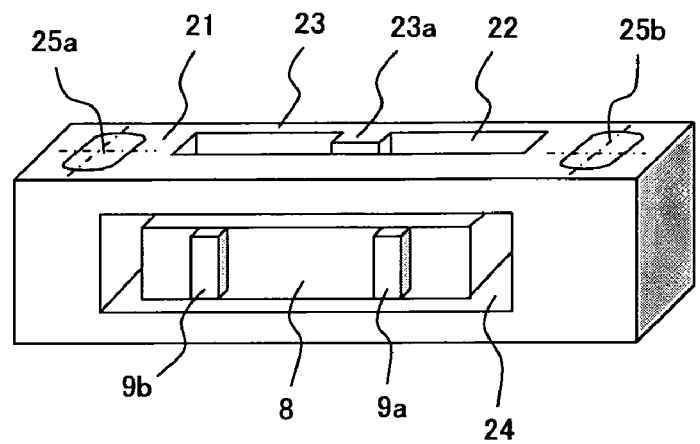
FIG. 9 is a perspective view of the configuration shown in FIG. 8A.
Figure 10:
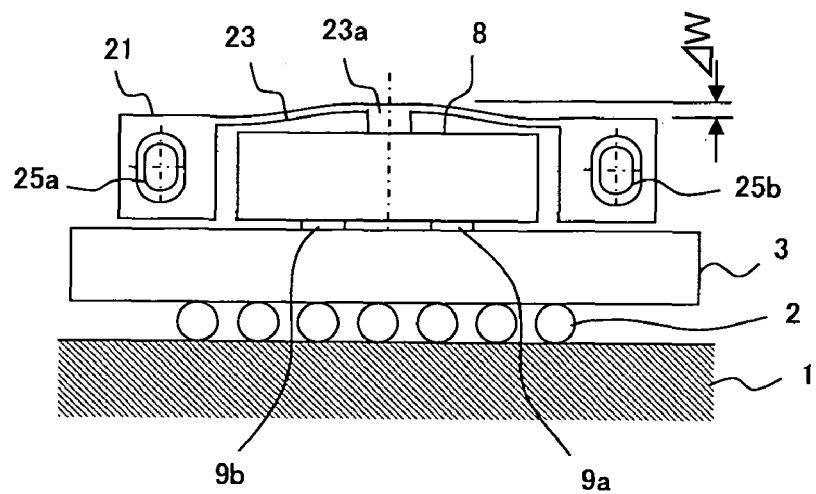
FIG. 10 is a schematic chart of the state of the holding member fixed to the fixing base according to the second mode for embodying the present invention.

FIG. 7 is a perspective view of the micromotion mechanism having an ultrasonic motor according to the second mode for embodying the present invention. FIG. 8A is a partial top view of the micromotion mechanism according to the present mode. FIG. 8B is a sectional view along B to B' shown in FIG. 8A. FIG. 9 is a perspective view of the configuration shown in FIG. 8A. FIG. 10 is a schematic chart of the state of the holding member fixed to the fixing base according to the present mode.

The micromotion mechanism having an ultrasonic motor according to the present mode has the configuration of a holding member as a holding mechanism for holding an oscillation element with respect to the fixing base different from the first mode for embodying the present invention. Otherwise, the present model is the same as the first mode for embodying the present invention.

In FIGS. 7 through 10, a holding member 21 is configured by a metal material of, for example, aluminum etc. In detail, as shown in FIG. 8A, the holding member 21 holds a thin leaf spring 23 (portion indicated by the diagonal lines in FIG. 8A) formed by providing a notch portion 22 by wire discharging process etc. In detail, as shown in FIG. 9, on the plane of the moving element 3 of the holding member 21, the notch portion 24 is provided in the wire discharging process etc., and is connected to the notch portion 22.

At the center of the thin leaf spring 23, a thick portion 23a not functioning as a spring is formed, and the thick portion 23a and the oscillation element 8 are adhered with a hard adhesive such as a ceramic adhesive. At this time, the thin leaf spring 23 and the oscillation element 8 are mounted such that they can be parallel to each other. The thick portion 23a is adhered around the center of the face of the oscillation element 8 on which the thick portion 23a is attached.

Thus, according to the present mode, adhering the oscillation element 8 to the thick portion 23a not functioning as a spring prevents the adhesion from being stripped off from the oscillation element 8 when the thin leaf spring 23 bends. In addition, by mounting the thin leaf spring 23 and the oscillation element 8 such that they can be close to each other, the rigidity of the thin leaf spring 23 in the tensile pressure direction can be enhanced. The geometry of the thick portion 23a formed at the center of the thin leaf spring 23 is not limited to the geometry shown in FIG. 8A, but can be any other geometries so far as the adhesion to the oscillation element 8 can be thick enough to protect against strip-off, the thin leaf spring 23 and the oscillation element 8 can be mounted parallel and close to each other.

The holding member 21 is fixed to the fixing base 1 as shown in detail in FIG. 10 such that two projections 9 (9a and 9b) provided on the reverse of the surface of the oscillation element 8 to which the holding member 21 is adhered can contact the sliding member 4, and the thin leaf spring 23 can be warped by Δw. FIG. 10 is a schematic chart with the sliding member 4 and the moving element 3 incorporated into one unit.

Furthermore, the holding member 21 is provided with fixing screw holes 25 (25a and 25b), and the holding member 21 is fixed to the fixing base 1 through the holes using screws. The fixing screw holes 25 are oval, and can be moved in the pressing direction to a certain extent. In FIG. 7, the fixing screw holes 25 and the screws for fixing the holding member 21 to the fixing base 1 are omitted.

In the micromotion mechanism according to the present mode, the moving axis direction of the moving element 3, the plane on which the projections 9 of the oscillation element 8 are provided, the plane to which the thick portion 23a is adhered on the oscillation element 8, and the tensile compression direction of the thin leaf spring 23 are parallel to one another.

In the micromotion mechanism having an ultrasonic motor according to the present mode with the above-mentioned configuration, the oscillation element 8 is held by the holding member 21 with a part of the oscillation element 8 inserted into the notch portion 24 of the holding member 21, thereby shortening the length of the configuration in the pressing direction in the state of the oscillation element 8 held by the holding member 21, and realizing a further down-sized configuration.

In addition, in the micromotion mechanism according to the present mode, as in the first mode for embodying the present invention, the oscillation element 8 is held with respect to the fixing base 1 only by an integrally incorporated holding member 21, and the friction sliding unit or a nonlinear element (including a high nonlinearity element) such as a rubber member etc. are not included in the holding member 21. Furthermore, since the rigidity that supports the drive direction of the moving element 3 substantially matches the rigidity of the thin leaf spring 23 in the tensile compression direction, the rigidity is high. Therefore, the contact between the projections 9 and the sliding member 4 is not changed by the oscillation of the oscillation element 8. There is no fear that the moving element 3 is stuck because of the microscopical displacement of the oscillation element 8 itself caused by the resistance force which is arisen when the moving element 3 moves. Thus, it is possible that the moving element 3 can be microscopically moved in a submicron order.

Additionally, in the micromotion mechanism according to the present mode, when the moving element 3 is moved, there can be a microscopic displacement occurring in the pressing direction by an influence of an error in processing and assembly. In this case, if the thickness of the thin leaf spring 23 is formed by the thickness of about 0.2 mm, then the pressing force does not exceed the maximum allowance force.

Assume that the thin leaf spring 23 formed on the holding member 21 presses the oscillation element 8.

In this case, the optimum value $F_{OP}$ of the pressing force is 10N, the maximum allowance value of the pressing force is 20N. Assuming that the thin leaf spring 23 is simplified into a thin leaf spring of a common geometry of 0.3 mm in thickness t, 20 mm in length L, and 5 mm in width b, and its material is aluminum, the rigidity $K_P$ of the thin leaf spring in the pressing direction is about 19N/mm. In this case, to apply a load of the optimum value $F_{OP}$, the thin leaf spring is warped by about 0.5 mm to hold the oscillation element 8.

Although the moving element 3 is displaced in the pressing direction of the oscillation element 8 by 0.05 mm when the moving element 3 moves, the increment of the pressing force is about 1N. Therefore, the maximum allowance value of 20N is not reached, and the microscopic drive can be performed without fail.

According to the present mode, the configuration using only the thin leaf spring 23 is described above. However, the plunger 11 described in the first mode for embodying the present invention and a well known elastic member can also be used to apply pressure from behind the thick portion 23a.

Furthermore, according to the micromotion mechanism of the present mode, as in the first mode for embodying the present invention, the following effect can be obtained. First, since the holding member 21 is configured by one metal part, the number of parts is minimized, and the production cost can be considerably reduced. Furthermore, since the oscillation element 8 is adhered to the thick portion 23a not functioning as a spring, the excessive stress by the deformation of a spring does not work on the adhesion surface, thereby further improving the durability. Furthermore, since there is no fear of the concentration of stress on the oscillation element 8, the durability can be further improved.

Thus, the first and second modes for embodying the present invention are described above. Each mode for embodying the present invention is configured by an incorporated structure of the holding member and the thin leaf spring. However, they can be configured as separate parts, and an incorporated structure can be realized when they are put together.

In each mode for embodying the present invention, the holding member is configured by a metal material such as aluminum, but other materials can be used so far as it is a high rigidity material not including high nonlinearity elements including at least one of a friction sliding unit and a rubber member.

The present invention is described above, but it is not limited to the above-mentioned modes and can be improved or changed within the gist of the present invention.

Thus, according to the present invention, a moving target can be moved in a submicron order, and can be stably moved even after the fluctuation of pressing force.

What is claimed is:

1. A micromotion mechanism having an ultrasonic motor, comprising:
   a fixing base;
   a moving element supported to be movable in a moving axis direction with respect to the fixing base;
   an oscillation element having a rectangular geometry including a first plane parallel to the moving axis direction and provided with a plurality of projections and a second plane parallel to the first plane for exciting a plurality of oscillation modes by applying a high frequency voltage signal; and a holding mechanism for holding the oscillation element with respect to the fixing base, wherein the holding mechanism does not include any high-nonlinearity elements, and comprises a high rigidity material that is not a friction sliding unit or a rubber member, which are high nonlinearity elements, and wherein the holding mechanism comprises a thin leaf spring provided parallel to a fixing surface of the oscillation element, and wherein the thin leaf spring comprises a thick portion not functioning as a spring at a central portion thereof, and holds a drive direction of the oscillation element with high rigidity by fixing the thick portion to a part of the second plane of the oscillation element.

2. The micromotion mechanism according to claim 1, wherein an elastic member of a spring constant lower than a spring constant of a pressing direction of the thin leaf spring is positioned to press the thick portion, and wherein the plurality of projections provided for the oscillation element are pressed by the elastic member with the oscillation element toward the moving element through the thick portion.

3. An oscillation element holding mechanism for a micromotion mechanism having a fixing base, a moving element supported to be movable in a moving axis direction with respect to the fixing base, and an ultrasonic motor, wherein an oscillation element included in the ultrasonic motor has a rectangular geometry including a first plane parallel to the moving axis direction and provided with a plurality of projections and a second plane parallel to the first plane, and excites a plurality of oscillation modes by applying a high frequency voltage signal, said oscillation element holding mechanism comprising:

a high rigidity material that is not a friction sliding unit or a rubber member, which are high nonlinearity elements, wherein the oscillation element holding mechanism does not include any high nonlinearity elements, wherein the oscillation element holding mechanism comprises a thin leaf spring provided parallel to a fixing surface of the oscillation element, and wherein the thin leaf spring comprises a thick portion not functioning as a spring at a central portion thereof, and holds a drive direction of the oscillation element with high rigidity by fixing the thick portion to a part of the second plane of the oscillation element.

* * * * *